(12) United States Patent  
Muschaweck et al.

(10) Patent No.: US 8,360,601 B2  
(45) Date of Patent: Jan. 29, 2013

(54) LED MODULE

(75) Inventors: Julius Muschaweck, Gauting (DE); Markus Zeiler, Undorf-Nittendorf (DE); Josef Huettner, Regensburg (DE); Felix Michel, Backnang (DE)

(73) Assignee: OSRAM Opto Semiconductors GmbH, Regensburg (DE)

( * ) Notice: Subject to any disclaimer, the term of this patent is extended or adjusted under 35 U.S.C. 154(b) by 594 days.

(21) Appl. No.: 12/529,802

(22) PCT Filed: Mar. 5, 2008

(86) PCT No.: PCT/DE2008/000394  
§ 371 (c)(1),  
(2), (4) Date: Oct. 27, 2009

(87) PCT Pub. No.: WO2008/110142  
PCT Pub. Date: Sep. 18, 2008

(65) Prior Publication Data  
US 2010/0061081 A1    Mar. 11, 2010

(30) Foreign Application Priority Data  
Mar. 9, 2007    (DE) .......................... 10 2007 011 988

(51) Int. Cl.  
F21V 9/00    (2006.01)

(52) U.S. Cl. .............. 362/231; 362/249.06; 362/249.14; 362/97.3

(58) Field of Classification Search ........ 362/97.1–97.4, 362/230, 231, 249.02–249.06, 800, 249.14; 445/3  
See application file for complete search history.

(56) References Cited

U.S. PATENT DOCUMENTS

| | | | |
|---|---|---|---|
| 6,623,142 B1 | 9/2003 | Lippmann et al. | |
| 6,923,548 B2* | 8/2005 | Lim ............................... | 362/612 |
| 7,344,291 B2* | 3/2008 | Hatanaka et al. ............. | 362/610 |
| 2003/0081228 A1 | 5/2003 | Spaulding et al. | |
| 2003/0214725 A1 | 11/2003 | Akiyama | |
| 2004/0227869 A1* | 11/2004 | Martynov et al. ............... | 349/61 |
| 2007/0019129 A1 | 1/2007 | Negley | |

FOREIGN PATENT DOCUMENTS

| | | |
|---|---|---|
| JP | 2001-222242 | 8/2001 |
| JP | 2003-116002 A | 4/2003 |
| JP | 2004-004626 A | 1/2004 |
| JP | 2006-251532 A | 9/2006 |
| JP | 2006-269756 A | 10/2006 |

\* cited by examiner

Primary Examiner — Bao Q Truong  
(74) Attorney, Agent, or Firm — Slater & Matsil, L.L.P.

(57) ABSTRACT

An LED module includes a carrier and a number of light sources. Each light source is arranged on the carrier in such a way that the LED module comprises a radiation uniformity which is less than the statistical mean of a radiation uniformity distribution, wherein the radiation uniformity distribution is based on a plurality of LED modules with a random arrangement of the light sources.

18 Claims, 3 Drawing Sheets

LED MODULE

This patent application is a national phase filing under section 371 of PCT/DE2008/000394, filed Mar. 5, 2008, which claims the priority of German patent application 10 2007 011 988.9, filed Mar. 9, 2007, each of which is incorporated herein by reference in its entirety.

TECHNICAL FIELD

The invention relates to an LED module and to a method of producing an LED module.

BACKGROUND

LED modules are used, for example, for backlighting LCDs. In such cases, a plurality of individual LEDs are arranged in a plane behind the display. In this case it can be difficult to achieve sufficiently uniform backlighting. These problems of uniformity have two different causes: firstly it would be difficult to construct simultaneously thin and uniform backlighting units even if completely identical LEDs were available, since particular optical construction effort is required just to achieve this "intrinsic" uniformity; secondly the LEDs are not identical. Efforts are made to use maximally uniform, presorted LEDs ("binning").

For reasons of measuring accuracy, but above all for reasons of otherwise "combinatorially explosive" logistics, it is not possible to set the boundaries narrow enough at the LED level when binning for the variability of LEDs of the same type. Particular problems arise when, due to sequential production processes or indeed merely due to chance, LEDs with similar deviations from the mean are used close to one another.

SUMMARY

In one aspect, the present invention provides an LED module with improved radiation uniformity.

In a further aspect, the invention provides a simple method of producing an LED module with improved color uniformity. This object is achieved by a method according to claim 11.

Advantageous embodiments and further developments of the LED module and of the method of producing such an LED module are disclosed herein.

An LED module according to the invention comprises a carrier and a plurality of light sources with, in each case, one light-emitting diode or a plurality of light-emitting diodes, wherein each light-emitting diode comprises a color location $F_i$ and a brightness $H_i$ and the light sources are arranged as a function of the color locations $F_i$ and/or the brightnesses $H_i$ in a predetermined position on the carrier in such a way that the LED module has a radiation uniformity $H_{BLU}$ which is less than the statistical mean $H^*$ of the radiation uniformity distribution which occurs in the case of a random arrangement of the light sources in the LED module. The LEDs are numbered consecutively by means of the sequence index i.

The LED module according to the invention is provided, in particular, for backlighting or illumination. For example, the LED module may be used for backlighting in a flat screen television or as a radiation source for general illumination.

Preferably, the radiation uniformity $H_{BLU}$ of the LED module is assessed using a scalar quality function. The quality function is calculated as follows: using a number of test points on a radiation exit surface, the color location of each test point is determined in the CIE-u'v' space or the CIE-L*a*b* space. Then the average color location of the LED module is calculated, together with the distance from the average color location for each test point. The quality function is preferably defined as twice the maximum resulting distance.

The radiation exit surface is determined as a surface which is located in a plane at a distance D from the carrier and which extends over the entire extent of the LED module.

Preferably, the radiation uniformity $H_{BLU}$ of the LED module is at most half as great as the statistical mean $H^*$ of the radiation uniformity distribution.

Here, an advantageous simulation method is used to calculate the radiation uniformity $H_{BLU}$ of the LED module. To this end, the brightness contribution of an LED is regarded as a parameterized function of a plurality of variables.

The variables are the location of the LED, the location of the observed point of the exit surface, and optionally further variables, which cause variations in the LED radiation pattern (for example, chip position tolerance). The brightness contribution of an LED is here regarded, for example, as an additive superposition of a plurality of two-dimensional Gaussian functions of different intensity and width; edge effects may be taken into account, for example, as a result of further, optionally elliptical Gaussian functions reflected at the edge. A continuous transfer function of the light from the individual LED located at a specific, but freely selectable, location to another freely selectable location on the exit surface is thus determined by the parameters of the Gaussian function used. Adaptation of these parameters may take place either by numerical optimization of the transfer function model using measurements or ray tracing simulations or "by hand."

The quality function is then defined as the maximum resultant distance. The quality function of the radiation uniformity $H_{BLU}$ may be determined from simulation results.

In a first approach, identical red, green and blue LEDs may be used for simulation and thus the "intrinsic radiation uniformity" of the LED module at various LED distances may be investigated. In continuing calculations, it is possible to use the LED bin boundaries read from the data sheet to generate random color and brightness values for the individual LEDs and thus to investigate the influence of the brightness and color differences of LEDs resulting from manufacture.

With such a simulation method it is possible, for example, with an LED module with 1000 LEDs and approximately 100×100 test points, i.e. 100×100×1000=$10^7$ functional evaluations of the transfer function, to determine the radiation uniformity $H_{BLU}$ with an experimentally determined time of approximately 0.3 µs per functional evaluation on a conventional commercial PC in around 3 seconds. Advantageously, the results do not exhibit any statistical noise, but do contain modeling errors therefor, the magnitude of which depends on the flexibility of the transfer function model used and the accuracy of parameter adaptation. The speed advantage consists in inserting the entire optical behavior of a specific construction of the LED module a single time into the transfer function model and then calculating a plurality of LED module configurations with this model.

Starting from the LEDs which are used in a light source of the LED module, the various radiation uniformity values $H_{BLU}$, which result from the various light source arrangement options in the light-emitting module, may be investigated statistically.

According to a preferred embodiment of the LED module, each light source comprises a light-emitting diode or a plurality of light-emitting diodes. Here, a light-emitting diode is taken preferably to mean a radiation-emitting component with at least one semiconductor chip. However an individual, radiation-emitting semiconductor chip may also be meant.

According to a further preferred embodiment, the light-emitting diodes are mounted on a printed circuit board.

In particular, each light source comprises at least two light-emitting diodes, which emit radiation of different wavelengths. For example, each light source may comprise at least one red, one green and one blue light-emitting diode. Preferably, a plurality of RGGB clusters are used for the light sources, i.e., clusters comprising one red, two green and one blue LED. Alternatively, each light source may comprise at least one light-emitting diode, which emits white light.

A method according to the invention for producing an LED module as described above comprises the following steps:
providing a plurality of light sources,
measuring the color location $F_i$ and the brightness $H_i$ of the individual light-emitting diodes of each light source,
calculating an optimal position for each light source on the carrier as a function of the values of the color location $F_i$ and/or the brightness $H_i$ in such a way that the LED module has a radiation uniformity $H_{BLU}$ which is less than the statistical mean $H^*$ of the radiation uniformity distribution which occurs in the case of a random arrangement of the light sources in the LED module,
positioning the light sources at the calculated positions on the carrier.

BRIEF DESCRIPTION OF THE DRAWINGS

Further features, advantages and further developments of the invention are revealed by the exemplary embodiments explained below in conjunction with FIGS. 1 to 3, in which.

DETAILED DESCRIPTION OF ILLUSTRATIVE EMBODIMENTS

Figure 1:
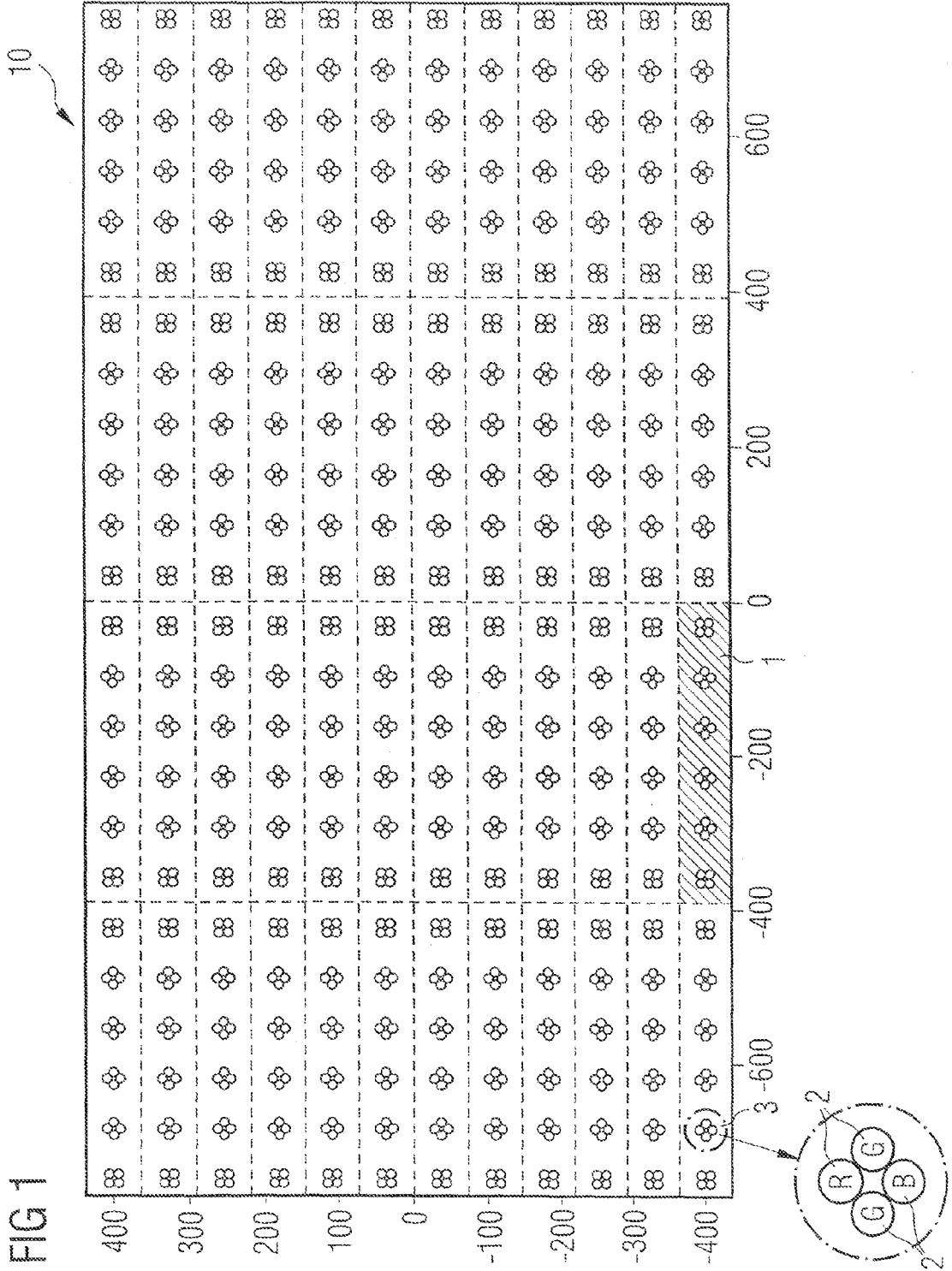
FIG. 1 is a schematic plan view of an LED module according to the invention.

The LED module 10 shown in FIG. 1 comprises 1152 LEDs 2. The LEDs 2 result in 48 light sources 1 each with 24 LEDs 2 each in 6 adjoining RGGB clusters 3. The light sources 1 are arranged on a carrier (not shown) in the manner of a matrix comprising twelve rows and four columns. The 48 light sources 1 of identical structure may be used in principle in any desired order. 48 light sources 1 result in $48! \cong 10^{61}$ options, unimaginably more than could be fully investigated. However, an impression of the probability distribution may be gained by randomly generating a certain number of arrangements (for example, 2000) and assessing them as mentioned above. In this way, the radiation uniformity distribution may be determined and the statistical mean $H^*$ of the radiation uniformity distribution and the variance thereof may be estimated. The light sources 1 are then arranged on the carrier in such a way that the radiation uniformity $H_{BLU}$ of the LED module 10 is less than the statistical mean $H^*$.

To determine the radiation uniformity distribution, first of all the color location $F_i$ and the brightness $H_i$ of the LEDs 2 are determined. For reasons of manufacturing control, the color location $F_i$ and the brightness $H_i$ of the individual LEDs 2 of each ready-populated light source 1 are in any case measured once again, although the LEDs 2 have typically already been grouped together by color location $F_i$ and brightness $H_i$ prior to population. Measurement for purposes of determining radiation uniformity distribution does not therefore require any additional effort. In addition, each individual light source 1 is conventionally labeled for defect traceability, for instance with a barcode sticker, making each light source 1 identifiable.

In the present case, the "final clearance" measured data for the individual light sources 1 may, for example, be stored together with the barcode of each light source 1 in a database belonging to the printed circuit board populater. While the light sources 1 are packaged together in assembly kits each for one LED module 10 and transported to the final assembly point, optimization calculation, as will be described below in greater detail, may advantageously take place offline. The result thereof may be transmitted electronically to the final assembly point.

During manual final assembly, the operator scans the barcode (he must do this in any event, for the sake of traceability) and the intended position for the light source 1 is then displayed on a screen. The position may also be displayed by marking the appropriate point on the carrier with an automatically controlled lamp. Final assembly may also be performed automatically, for example, by means of a robot. In both cases (manual assembly or automated assembly), the sum of the traverse paths is not increased by the optimization procedure.

The information available at the light source level is used to simulate the radiation uniformity distribution. It may be attempted with the present information to find by numerical optimization the best possible arrangement for the light sources 1, such that the finished LED module 10 has optimized radiation uniformity $H_{BLU}$.

The problem of finding the best possible arrangement is related to the classic "travelling salesman" problem of optimization theory (in what order should a travelling salesmen visit 100 towns so as to minimize the total distance traveled?). This problem is known to be NP complete. The search for the overall optimum of the more than $10^{61}$ possibilities is thus hopeless. However, a very good solution may be found with the method of "simulated annealing" that is selected here. This method is inspired by the manner in which the arrangement of crystallites in a piece of steel when annealing achieves a minimum of free energy.

Starting from an initial arrangement, random transposition of individual light sources or individual disjunct rectangular light source areas is selected. The radiation uniformity H of this changed arrangement is calculated. If there is an improvement, the new arrangement is adopted in each case. If there is an impairment of ΔH, this new arrangement is accepted with a probability of exp(−ΔH/T). T is here a parameter, designated "temperature", which at the start of calculation is intended to have such a high value that a large number of impairments are also accepted. In the course of calculation, the parameter T is then lowered gradually until almost only genuine improvements are selected.

Advantageously, in the present case, the information available about the color location $F_i$ and the brightness $H_i$ of the LEDs 2 is used and translated into readily automated manufacturing instructions implementable virtually without additional effort. Here, not only are poor LED-modules avoided, but radiation uniformity H is also improved systematically and significantly for virtually all LED modules 10.

Figure 2:
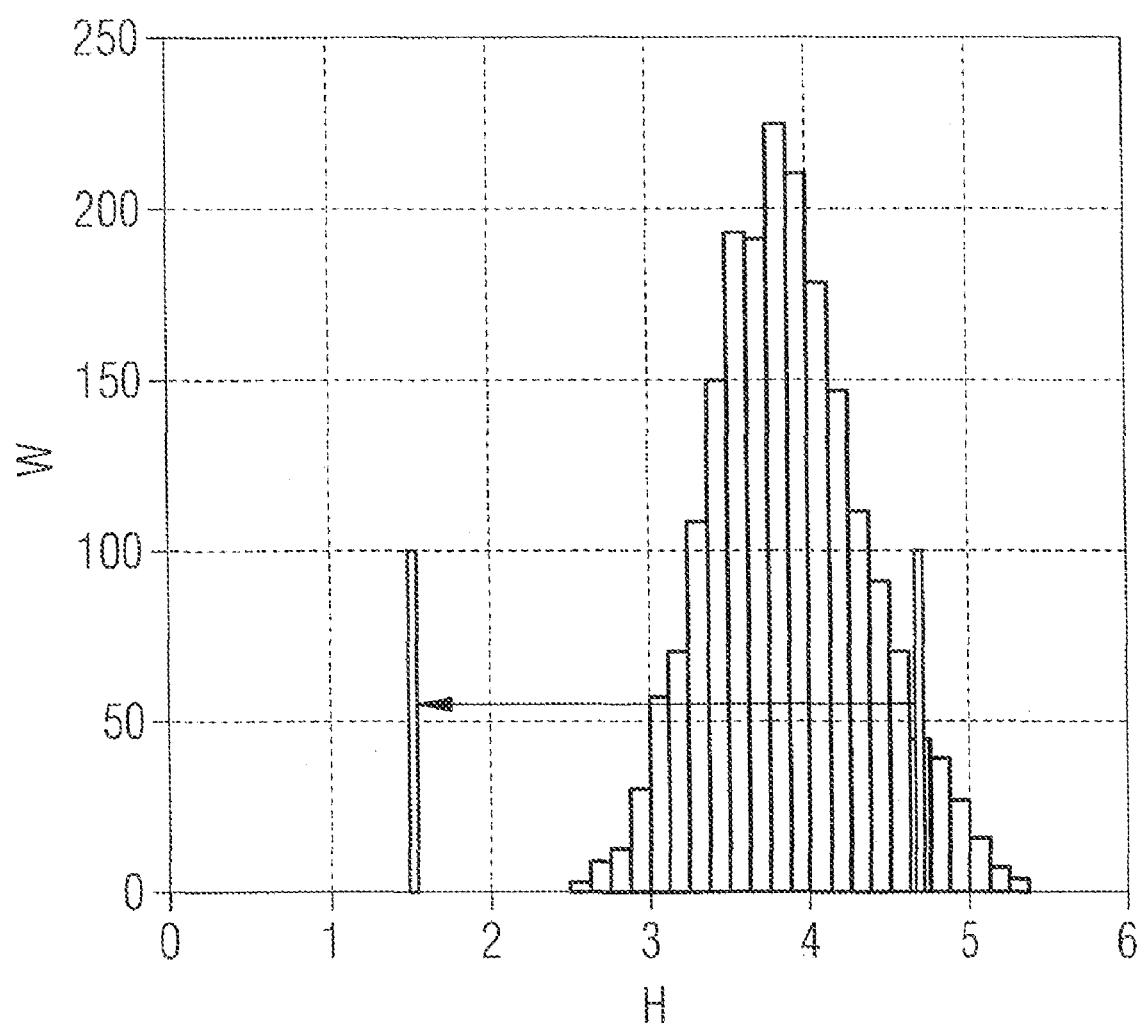
FIG. 2 is a histogram showing a frequency distribution W of the radiation uniformity $H_{BLU}$ for an LED module with random arrangement of the light sources.

FIG. 2 shows the result of a calculation according to the invention. On the x-axis the radiation uniformity H is plotted in JNDs (Just Noticeable Differences). The y-axis indicates the frequency W of the radiation uniformity H for a predetermined number of random arrangements, in this case 2000 random arrangements, in the respective interval.

In the illustrated case, the histogram distribution has a random mean H* of around 4 JNDs and a total width of around 3 JNDs. The best value for the 2000 random arrangements is around 2.5 JNDs. The bar at 1.5 JNDs shows the value of the optimum arrangement determined by the optimization procedure from a total of around 2000 tested arrangements. There can be no argument that the optimum found lies a long way outside the histogram distribution. This merely shows that the actual distribution is clearly wider than can be seen with only 2000 random tests.

Figure 3:
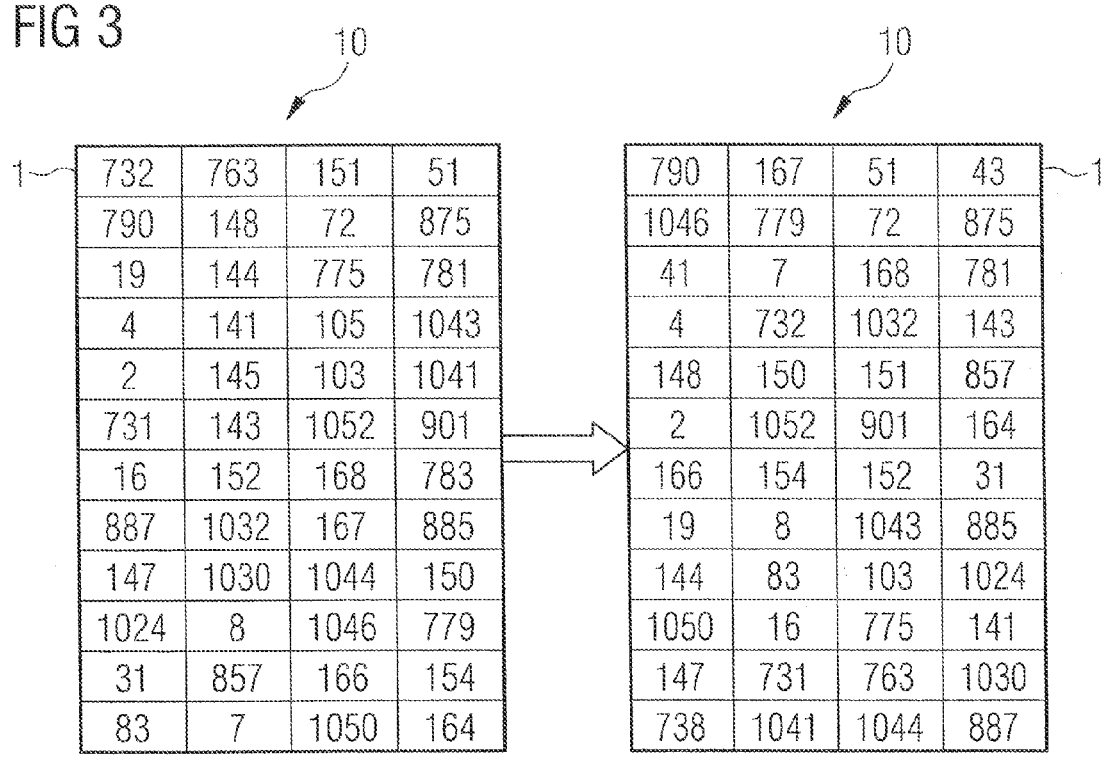
FIG. 3 is a schematic representation of a light source arrangement in a conventional LED module and in one according to the invention.

By way of comparison, FIG. 3 shows on the left a conventional LED module 10 with a radiation uniformity H=4.6 JNDs and on the right an LED module 10 according to the invention with an optimized radiation uniformity $H_{BLU}$=1.5 JNDs. In the conventional LED module 10 red, green and blue LEDs are presorted into bins in accordance with brightness and color location and mounted "bin-wise" on printed circuit boards, a light source 1 being produced from 24 LEDs. The light sources 1 are mounted randomly on the carrier. The LED module 10 according to the invention differs in the arrangement of the light sources 1 from the conventional LED module 10, as is clear from the numbering of the light sources 1. In the case of a random arrangement of the light sources it is very improbable that the optimized radiation uniformity $H_{BLU}$ is achieved (see FIG. 2 H=4.6 JNDs is more probable than $H_{BLU}$=1.5 JNDs).

It should be explicitly noted that the method can be applied without further changes to other assessment functions that also assess the gradient in addition to color location and/or brightness.

The invention is not restricted by the description given with reference to the exemplary embodiments. Rather, the invention encompasses any novel feature and any combination of features, including, in particular, any combination of features in the claims, even if this feature or this combination is not itself explicitly indicated in the claims or exemplary embodiments.

The invention claimed is:

1. An LED (light-emitting) module comprising:
a carrier; and
a plurality of light sources, each light source comprising a light-emitting diode or a plurality of light-emitting diodes, wherein each light-emitting diode comprises a color location and a brightness and the light sources are arranged as a function of the color locations and/or the brightnesses in a predetermined position on the carrier in such a way that the LED module has a radiation uniformity that is less than a statistical mean of a radiation uniformity distribution that occurs in the case of a random arrangement of the light sources in the LED module, wherein radiation uniformity of the LED module is at most half as great as the statistical mean of the radiation uniformity distribution.

2. The LED module according to claim 1, wherein the light-emitting diodes are mounted on a printed circuit board.

3. The LED module according to claim 1, wherein each light source comprises at least two light-emitting diodes that emit radiation of different wavelengths.

4. The LED module according to claim 3, wherein each light source comprises at least one red, one green and one blue light-emitting diode.

5. The LED module according to claim 4, wherein each light source comprises at least one light-emitting diode that emits white light.

6. The LED module according to claim 1, wherein each light source comprises twenty-four light-emitting diodes.

7. The LED module according to claim 1, wherein the light sources are arranged on the carrier in the manner of a matrix.

8. The LED module according to claim 7, wherein the matrix comprises twelve rows and four columns.

9. The LED module according to claim 1, wherein the LED module is provided for backlighting or illumination.

10. A method of producing an LED module, the method comprising:
providing a plurality of light sources, each light source comprising a plurality of light-emitting diodes, each light-emitting diode comprising a color location,
measuring the color location and/or a brightness of each individual light-emitting diode of each light source,
calculating a position for each light source on a carrier as a function of values of the color location and/or the brightness in such a way that the LED module has a radiation uniformity that is less than a statistical mean of a radiation uniformity distribution that occurs in the case of a random arrangement of the light sources in the LED module, and
positioning the light sources at calculated positions on the carrier,
wherein radiation uniformity of the LED module is at most half as great as the statistical mean of the radiation uniformity distribution.

11. The method according to claim 10, wherein calculating the position comprises simulated annealing.

12. The method according to claim 10, wherein providing the light sources comprises populating a plurality of printed circuit boards with, in each case, a plurality of light-emitting diodes.

13. The method according to claim 12, wherein the light-emitting diodes are grouped together by color location and brightness prior to populating.

14. The method according to claim 10, wherein each light source comprises at least one red, one green and one blue light-emitting diode.

15. The method according to claim 14, wherein each light source further comprises at least one light-emitting diode that emits white light.

16. The method according to claim 10, wherein each light source comprises twenty-four light-emitting diodes.

17. The method according to claim 16, wherein the light sources are arranged in a matrix comprising twelve rows and four columns.

18. An LED module comprising:
a carrier; and
a plurality of light sources, each light source comprising a light-emitting diode or a plurality of light-emitting diodes, each light-emitting diode comprising a color location and a brightness;
wherein the light sources are arranged in a such a way that the LED module has a radiation uniformity that is at most half as great as a statistical mean of a radiation uniformity distribution that occurs in the case of a random arrangement of the light sources in the LED module.

* * * * *

UNITED STATES PATENT AND TRADEMARK OFFICE
CERTIFICATE OF CORRECTION

PATENT NO. : 8,360,601 B2
APPLICATION NO. : 12/529802
DATED : January 29, 2013
INVENTOR(S) : Muschaweck et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 642 days.

Signed and Sealed this
First Day of September, 2015

Michelle K. Lee
*Director of the United States Patent and Trademark Office*